(12) United States Patent
Parulski et al.

(10) Patent No.: US 8,508,623 B2
(45) Date of Patent: *Aug. 13, 2013

(54) IMAGE FILE FOR STORING DIGITAL IMAGES AND ANCILLARY DATA VALUES USING MULTIPLE ENCODING METHODS

(75) Inventors: Kenneth A. Parulski, Rochester, NY (US); Joseph Ward, Hilton, NY (US); George E. Lathrop, Dansville, NY (US); J. Scott Houchin, Rochester, NY (US); Eddie Jennings, Rochester, NY (US); Brett Vansprewenburg, Henrietta, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,013

(22) Filed: Aug. 12, 2011

(65) Prior Publication Data

US 2012/0033102 A1 Feb. 9, 2012

Related U.S. Application Data

(63) Continuation of application No. 12/835,774, filed on Jul. 14, 2010, now Pat. No. 7,999,860, which is a continuation of application No. 11/564,867, filed on Nov. 30, 2006, now Pat. No. 7,782,372, which is a continuation of application No. 09/950,199, filed on Sep. 10, 2001, now Pat. No. 7,271,832, which is a continuation of application No. 09/028,682, filed on Feb. 24, 1998, now Pat. No. 6,310,647.

(60) Provisional application No. 60/042,221, filed on Apr. 15, 1997.

(51) Int. Cl.
*H04N 5/76* (2006.01)
*H04N 9/64* (2006.01)

(52) U.S. Cl.
USPC .................................. 348/231.99; 348/246

(58) Field of Classification Search
USPC .................................. 348/231.99, 539, 246
See application file for complete search history.

(56) References Cited

U.S. PATENT DOCUMENTS

| | | |
|---|---|---|
| 4,910,596 A | 3/1990 | Kieft |
| 5,016,107 A | 5/1991 | Sasson et al. |
| 5,528,293 A | 6/1996 | Watanabe |
| 5,666,503 A | 9/1997 | Campanelli et al. |
| 5,739,850 A | 4/1998 | Hori |
| 5,806,072 A | 9/1998 | Kuba |

(Continued)

OTHER PUBLICATIONS

Watanabe et al., An Image Data File Format for Digital Still Camers, May 1995, IS&T's 48th Annual Conference Proceedings, vol. 48, p. 421-424.

*Primary Examiner* — James Hannett (57) ABSTRACT

An image format for storing digital images within a baseline DCT compatible bitstream comprises entropy coded image data, a first application marker storing a first data value using a first encoding method to convey a first information value related to the image, and a second application marker storing a second data value using a second encoding method to convey the same said first information value related to the image. More specifically, the first application marker uses TIFF tags within an Exif application marker and the second application marker uses a FlashPix compatible structured storage stream, while the entropy coded data includes restart markers to define tile boundaries within the entropy coded image data.

15 Claims, 1 Drawing Sheet

(56) References Cited

U.S. PATENT DOCUMENTS

| | | |
|---|---|---|
| 5,848,192 A | 12/1998 | Smith |
| 5,854,857 A | 12/1998 | De Queiroz |
| 5,933,137 A | 8/1999 | Anderson |
| 6,049,390 A | 4/2000 | Notredame |
| 6,072,936 A | 6/2000 | Koyama |
| 6,126,078 A | 10/2000 | Locher et al. |
| 6,128,038 A | 10/2000 | Nakajima |
| 6,144,763 A | 11/2000 | Ito |
| 6,177,956 B1 | 1/2001 | Anderson |
| 6,192,191 B1 | 2/2001 | Suga et al. |
| 6,310,647 B1 | 10/2001 | Parulski et al. |
| 6,411,331 B1 | 6/2002 | Sansom-Wai et al. |
| 7,782,372 B2 * | 8/2010 | Parulski et al. ............ 348/231.9 |
| 7,999,860 B2 * | 8/2011 | Parulski et al. .......... 348/231.99 |
| 2001/0020979 A1 | 9/2001 | Lathrop |
| 2001/0041014 A1 | 11/2001 | Kaneda |

* cited by examiner

IMAGE FILE FOR STORING DIGITAL IMAGES AND ANCILLARY DATA VALUES USING MULTIPLE ENCODING METHODS

CROSS REFERENCE TO RELATED APPLICATIONS

This is a continuation of prior U.S. patent application Ser. No. 12/835,774, filed Jul. 14, 2010, now U.S. Pat. No. 7,999,860 now allowed, which is a continuation of U.S. patent application Ser. No. 11/564,867, filed Nov. 30, 2006 now U.S. Pat. No. 7,782,372 issued Aug. 24, 2010, which is a continuation of U.S. patent application Ser. No. 09/950,199, filed Sep. 10, 2001 now U.S. Pat. No. 7,271,832 issued Sep. 18, 2007 which is a continuation of U.S. patent application Ser. No. 09/028,682, filed Feb. 24, 1998 now U.S. Pat. No. 6,310,647 issued Oct. 30, 2001, which claims the benefit of U.S. Provisional Patent Application No. 60/042,221, filed Apr. 15, 1997, each of which is incorporated herein by reference in its entirety.

FIELD OF THE INVENTION

The invention relates generally to the field of digital photography, and in particular to image file formats developed for use with digital cameras and their applications.

BACKGROUND OF THE INVENTION

Electronic still cameras typically capture, digitize, and store images on a removable memory device, such as a PCM-CIA or Compact Flash card. The images are stored on the card in separate image files. Many different image file formats may be used. To increase the number of images stored per card, image compression is typically used to reduce the file size. The most popular compression standard is the JPEG (Joint Photographic Expert Group) baseline DCT (discrete cosine transform) method, which compresses the image components (for example a luminance component Y and two color difference components Cb and Cr) using 8×8 pixel blocks.

It is desirable for digital cameras to produce images that can be easily transferred into other digital devices (e.g. computers) for editing, display, transmission, archival storage, and printing. This requires a standard image data format, not just standards for the physical and electrical compatibility of the removable memory card. The format should be supported by popular application software, so that the user does not need to worry about whether the image format is compatible with the various image-capable applications on their computer.

The "FlashPix" image format (defined in FlashPix Format Specification, version 1.0, (Eastman Kodak Company, Sep. 11, 1996)) has been developed to serve as both an "interchange" format between devices (e.g. cameras) and applications (e.g. computer picture editing packages), and as a "native" format for image editing that allows the images to be easily and rapidly edited. This is accomplished using a hierarchical, tiled image representation within a "structured storage" file. A FlashPix file contains the complete image plus a hierarchy of several lower-resolution copies within the same file. Images at each resolution also are divided into rectangular tiles (e.g., squares), which enable the application to minimize the amount of image data processed to access, display or print a portion of the scene content. FlashPix allows optional "ancillary" data to be stored in the same structured storage file, along with the image data. This ancillary data can include digital audio recordings and parameters such as the time and date the photo was taken, the camera zoom position and focus distance, the scene illumination level, camera calibration data, image copyright owner, etc. For further information about the FlashPix image format see the aforementioned FlashPix Format Specification, version 1.0, (Eastman Kodak Company, Sep. 11, 1996), which is available from Eastman Kodak Co. or at the Eastman Kodak Co. Web site at www.kodak.com/go/flashpix, and is incorporated herein by reference.

Unfortunately, because FlashPix is a relatively new format, many computer applications are not yet capable of reading FlashPix image files. On the other hand, most applications are able to open images stored in "JPEG interchange format" (JIF) files defined by the Baseline DCT (JPEG) version of ISO/IEC 10918-1, which is incorporated herein by reference. This standard allows "application markers" to be included in the JIF bitstream. The data inside an application marker is ignored by applications that are not familiar with the marker. A number of image file formats have been developed which use a single application marker segment to store ancillary data and a reduced-resolution "thumbnail" image. These image formats include JFIF, defined in "JPEG File Interchange Format Version 1.02 Sep. 1, 1992 C-Cube Microsystems", the JPEG compressed version of Exif (Exchangeable image format) described in "Digital Still Camera Image File Format Proposal (Exif) Version 1.0 Mar. 24, 1995 JEIDA/Electronic Still Camera Working Group" and SPIFF, defined in "ITU-T Rec. T.84, Annex F—Still Picture Interchange File Format, 1995", which are each incorporated herein by reference.

For example, Exif allows some camera-related ancillary data, such as the date and time, lens f/number, etc, to be recorded using TIFF (Tag image file format) tags within an application marker 1 (APP1) segment in the JIF bitstream. (TIFF is defined in the TIFF Revision 6.0, Jun. 3, 1992, by Adobe Corp. and available on the Web at http://www.Adobe.com, and incorporated herein by reference.) Exif images can be opened by any computer application software that incorporates a JPEG reader. However, the ancillary data in the Exif file can only be accessed by applications designed specifically for Exif. When an Exif file is converted to a FlashPix file (e.g. by the Microsoft PictureIt application), the information recorded using the TIFF tags is typically ignored by the reader, since the FlashPix conversion programs are typically not familiar with the structure of the Exif application marker and therefore ignore it. Thus, the ancillary information is lost. If the FlashPix application was familiar with the Exif application marker, it would need to read each individual TIFF tag, decode the information values from each tag (for example, one specific tag encodes the camera f/number as a rational number value) and then re-encode the values using the encoding method specified by FlashPix (which encodes the camera f/number as a real number value, rather than a rational number value, for example)

Each resolution level of a FlashPix image is "tiled" into 64×64 pixel images, and stored as a group, or "stream" of these small image sections. However, the baseline DCT JPEG standard does not allow the image data to be stored in tiles. Instead, the data is stored as a single image record, by encoding all of the image blocks from left to right and top to bottom into a single data record. Therefore, to convert an Exif or other JIF compatible file format to a FlashPix image, the full resolution image is normally decompressed, tiled, and then recompressed. This process takes time, and may add compression artifacts.

What is needed is an image file format that is completely compatible with the Baseline DCT (JPEG) version of ISO/IEC 10918-1, so that it can be opened by all existing "JPEG" enabled software applications, yet can be quickly and easily converted to the FlashPix format, so that new applications can take advantage of the tiling and ancillary information capabilities offered by FlashPix.

SUMMARY OF THE INVENTION

The present invention is directed to overcoming one or more of the problems set forth above. Briefly summarized, according to one aspect of the present invention, there is provided a single digital image file, comprising:

a) entropy coded image data provided by processing a digital image captured by a digital camera;

b) a first ancillary data value using a first encoding method to convey a first information value related to the digital image captured by the digital camera; and c) a second ancillary data value, different from said first ancillary data value and encoded using a second encoding method, different from said first encoding method, wherein the second ancillary data value conveys the same said first information value.

Another aspect of the present invention is to provide a memory for storing digital image files, comprising:

a) a plurality of digital image files, and b) a directory that indicates where the data for each of the plurality of digital image files is stored on the memory card, wherein each of the plurality of digital image files comprises:

i) entropy coded image data;

ii) a first ancillary data value using a first encoding method to convey a first information value related to the digital image captured by the digital camera; and iii) a second ancillary data value, different from said first ancillary data value and encoded using a second encoding method, different from said first encoding method, wherein the second ancillary data value conveys the same said first information value.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and formats are well known, the present description will be directed in particular to elements forming part of, or cooperating more directly with, systems and formats in accordance with the present invention. Elements not specifically shown or described herein may be selected from those known in the art. Many aspects of the present description may be implemented in software. Unless otherwise specified, all software implementation is conventional and within the ordinary skill in the programming arts.

The invention is an image file format developed to be compatible with or easily transcodable to multiple image formats. The format follows the Baseline DCT ("JPEG") version of ISO/IEC 10918-1, so that it can be opened by existing "JPEG" enabled software applications such as Microsoft Word for Windows, Adobe Photoshop, etc. In addition, it can include application markers for both Exif and SPIFF, two different JPEG interchange format (JIF) based image formats. Furthermore, it includes features that allow easy transcoding to the FlashPix image format, such as: (1) an application marker segment that includes the "Image Info Property Set" defined in the FlashPix standard, so that this data can be copied into the FlashPix file. (2) restart markers that define 64×64 tile segments added to the entropy coded image, so that the entropy coded Baseline DCT full size image can be converted into the proper size tiles required by the FlashPix image format without decompression.

Figure 1:
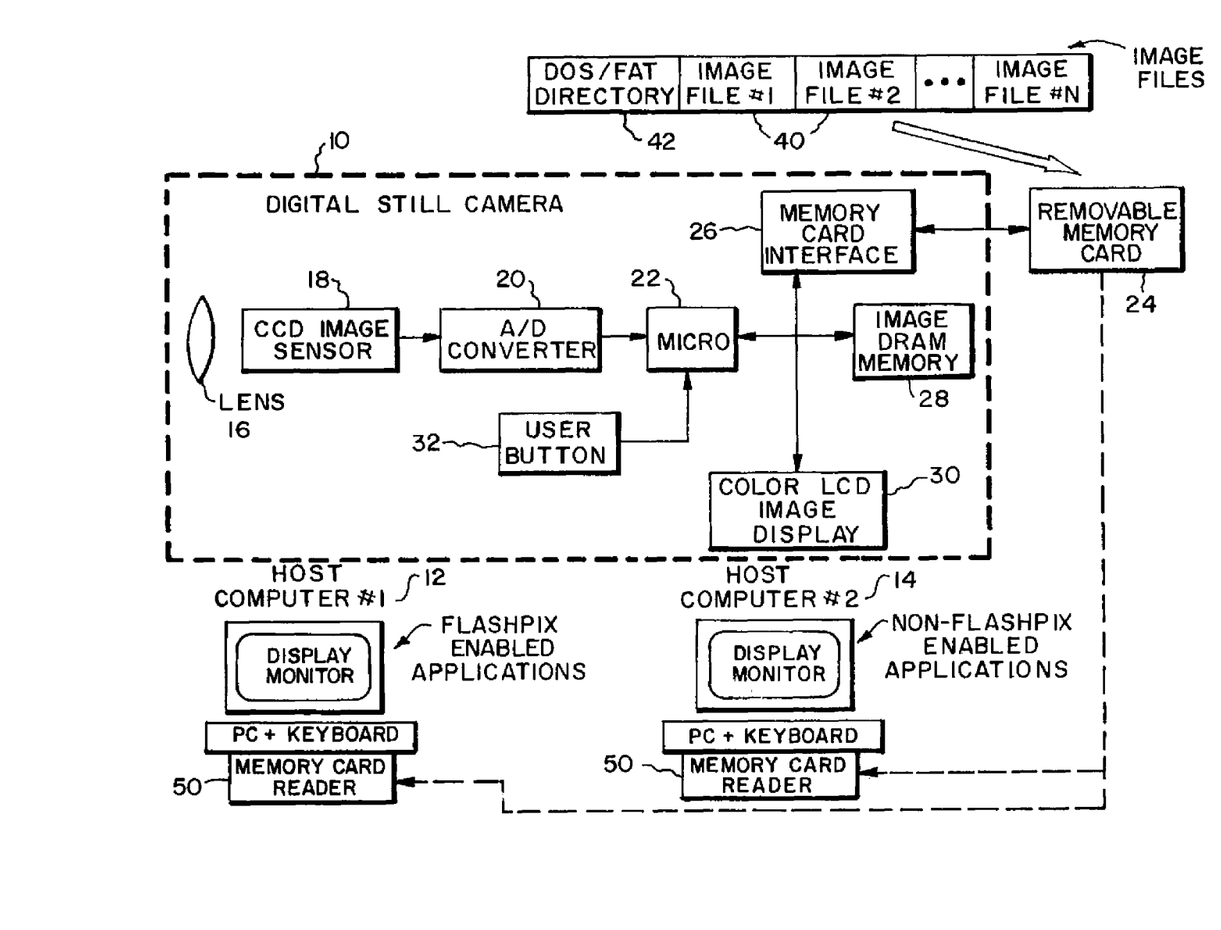
FIG. 1 is a block diagram of a digital imaging system including a digital camera that generates a multi-format compatible image file format according to the invention.

A system block diagram according to the invention is shown in FIG. 1 of a digital still camera 10 and respective first and second host computers 12 and 14. Images are captured through a lens 16 by a CCD sensor 18, converted to digital image data by an A/D converter 20, processed by a programmable processor 22, and stored on a removable memory card 24 via an interface 26. The card 24 stores a single file 40 for each digital image (image #1, image #2, . . . image #N) and a directory 42 that indicates how many image files 40 exist on the card 24, and where the data for each file is located. The memory card 24 can then be removed from the camera and inserted into card readers 50 in the host computers 12 and 14 where an image can be edited, displayed, printed, transmitted, etc using various software applications. Some of these computer applications, e.g., the host computer 12, may be capable of reading FlashPix and JIF files, while others, e.g., the host computer 14, may be capable of only reading JIF files.

Each of the image files 40 is organized as shown in TABLE 1. The SOI, DQT, DHT, SOF, SOS, and EOI markers, which are all well known since they are defined in ISO/IEC 10918-1, comprise the following:

TABLE 1

| Image File |
| --- |
| SOI |
| (Start of Image) |
| APP8 segment |
| (SPIFF fixed data) |
| APP1 segment |
| (Exif TIFF tags, plus |
| additional TIFF/EP tags, |
| Kodak cameraInfo tags |
| and TIFF thumbnail) |
| APP2 segments |
| (Flash Pix standard |
| image data area and |
| Image Info Property Set) |
| DQT |
| (Quantization Table) |
| DHT |
| (Huffman Table) |
| SOF |
| (Start of Frame) |
| SOS |
| (Start of Scan) |
| Entropy Coded Data |
| Y, Cb, Cr 4:1:1 data |
| derived from sRGB |
| EOI |
| (End of Image) |

1. SOI (Start of Image) is the marker code "FFD8" which defines the beginning of the file.

2. The SPIFF marker is defined in the reference cited earlier. The format of this marker segment is shown in Table 2.

TABLE 2

SPIFF application marker

| Parameter | Type and size | Value |
|---|---|---|
| MN (magic number) | 1.32 | X'FFD8FFE8(includes SOI) |
| HLEN (header length) | 1.16 | 28 (Not including MN) |
| IDENT (SPIFF identifier) | 1.32 | X'53504600' |
| VERS (Version) | 1.16 | X'0100' |
| P (Profile) | 1.8 | X'01' (Continuous tone) |
| C (Compression type) | 1.8 | X'05' (JPEG continuous tone) |
| S (Color space) | 1.8 | X'03' (JFIF color) |
| R (Resolution units) | 1.8 | X'01' (dots per inch) |
| HEIGHT | 1.32 | Lines in luma input image |
| WIDTH | 1.32 | Pixels per line in luma input image |
| VRES | 1.32 | 72 dots |
| HRES | 1.32 | 72 dots |

3. The Exif marker is defined in the reference cited earlier. The format of this marker segment is shown in Table 3.
4. The FlashPix Image Info Property Set marker is defined later in this document.
5. DQT (Define Quantization Table) is a marker code segment that begins with "FFD9" which defines the beginning of the quantization tables used for JPEG compression. Three kinds of tables are included, one for luminance (Y) and one for each of the two color difference signals Cb and Cr.
6. DHT (Define Huffman Table) is a marker code segment that begins with "FFC4" which defines the Huffman Tables used for JPEG compression. Within the DHT, four sets of parameters are recorded. These are the DC and AC tables for Y and C, respectively.
7. SOF (Start of Frame) is a marker code segment that begins with "FFC0". It provides the following parameter information:
   Indicates baseline JPEG compression is used
   Sample precision in bits
   Number of vertical lines in the Y image
   Number of horizontal pixels in the Y image
   Three components (Y, Cr, Cb)
   Cr and Cb subsampling (Cr and Cb have ½ as many lines and pixels per line as Y)
   Which quantization table is used for Y, Cb, and Cr.

TABLE 3

Exif application marker

| | |
|---|---|
| APP1 Marker = 0x FEE | |
| APP1 Length | |
| Exif Identifier & Pad | |
| TIFF Header | |
| IFD 0 describing JPEG Compressed Image | Number of directory entries |
| | ImageDescription |
| | Make, etc. |
| | ExifIFD Tag/Pointer |
| | Next IFD Offset |
| Exif Private IFD | Number of directory entries |
| | Exif Version |
| | DateTimeOriginal |
| | etc |
| | Next IFD Offset |
| IFD 1 describing Thumbnail Image | Image Width |
| | Image Length |
| | BitsPerSample |
| | Compression |
| | Photometric Interpretation |
| | StripOffsets |
| | SamplesPerPixel |
| | RowsPerStrip |
| | StripByteCounts |

TABLE 3-continued

Exif application marker

| | |
|---|---|
| | XResolution |
| | YResolution |
| | Resolution Unit |
| | Next IFD Offset |
| Thumbnail Image data (I strip RGB image data) | |

8. SOS (Start of Scan) is a marker code segment that begins with "FFDA".
   It provides the following parameter information:
   Indicates that there are three components in the scan
   Indicates which Huffman tables are used for Y, Cb, and Cr.
9. The Entropy Coded Data is tiled as shown in Table 5. Each 64×64 pixel (4096 pixel) tile includes an 8×8 group (64 total) of luminance DCT blocks and 4×4 group (16 total) Cb and Cr chroma DCT blocks. Each macroblock consists of 4 luminance and 1 each Cb and Cr chrominance blocks. Therefore, restart markers are placed after appropriate groups of macroblocks.
10. EOI (End of Image) is the marker code "FFD9" which defines the end of the file.

FPXR Application Segments

All FPXR (FlashPix ready) application segments have a similar structure. This structure is depicted in Table 4. It consists of a 2-byte APP2 marker followed by a 2-byte segment length (L) value stored in big endian format. The initial 4 bytes follow the application marker specification in ISO/IEC 10918-1. Following this is 5 bytes consisting of a NULL-terminated string "FPXR." The next byte is a version number. The next byte is a type followed by a series of L-9 bytes whose format depends on this type. Bytes 0 through 10 are referred to as the FPXR segment header.

TABLE 4

FPXR Application Segment.

| Offset | Value | Description |
|---|---|---|
| 0 | 0xFF | Marker for APP2 |
| 1 | 0xE2 | |
| 2 | | Segment length = L |
| 3 | | (big endian) |
| 4 | 0x46 | |
| 5 | 0x50 | "FPXR" |
| 6 | 0x58 | |
| 7 | 0x52 | |
| 8 | 0x00 | String NULL terminator |
| 9 | 0x00 | Version (must be zero) |
| 10 | | FPXR type |
| 11 | | |
| | | FPXR data area |
| | | (format depends on FPXR type) - |
| L + 1 | | L-9 bytes in length |

Note that the segment length, L, is a 16-bit number. Therefore, the maximum size allowed in any one FPXR data area is 65526 bytes.

The valid values for FPXR types are:

| Value | Description of FPXR Data Area | Required/Optional |
|---|---|---|
| 0x00 | Standard Image Data | required |
| 0x01 | Contents List | optional |
| 0x02 | Stream data | optional |

The exact format of the various FPXR data areas will be described in the following sections.

FPXR Standard Image Data Area

Each image file contains (as the first FPXR APP2 segment) a single FPXR standard image data segment (FPXR type 0x00). In some cases, a digital camera could create an image file which has no other FlashPix specific data. This single segment serves to establish that the file includes restart markers that define the tile boundaries, as described later. The format of the standard image data area is defined in Table 5. Even though these values are embedded in the JPEG stream, they are repeated here for the convenience of the application reading the FPXR file.

TABLE 5

FPXR Standard Image Data Area.

| Offset | Value | Description |
|---|---|---|
| 11 | | Pixel X dimension |
| 12 | | (# pixels per line) |
| 13 | | Pixel Y dimension |
| 14 | | (# lines) |
| 15 | | Color space |
| 16 | | Chroma subsampling |
| 17 | | Offset to start |
| 18 | | of JPEG DQT header |
| 19 | | |
| 20 | | |
| 21 | | Offset to start |
| 22 | | of JPEG SOF header |
| 23 | | |
| 24 | | |
| 25 | | Offset to start of JPEG |
| 26 | | compressed data |
| 27 | | |
| 28 | | |

The valid values for color space are:

| Value | Description |
|---|---|
| 0x03 | NIFRGB |
| 0x01 | Monochrome |

These values are consistent with their definitions in the FlashPix specification. The chroma subsampling value is stored exactly as in the tile header table of the Subimage Header Stream of the FlashPix file. The valid values are:

| Value | Horizontal Subsampling Ratio | Vertical Subsampling Ratio |
|---|---|---|
| 0x11 | 1 | 1 |
| 0x21 | 2 | 1 |
| 0x22 | 2 | 2 |

In the case of monochrome, the subsampling value is not meaningful and is set to zero.

In addition, there are three file offsets (measured in bytes from the beginning of the FPXR file) to aid the application in putting together pieces of the FPXR file to form the abbreviated JPEG header table in the Compression Description Group of the Image Contents Property Set of the FlashPix file and also to build tile headers. Each of these offsets are stored in 32-bit unsigned integer (big endian). The first offset is the address of the first byte of the DQT header in the FPXR file. The second offset is the address of the first byte of the SOF header in the file. The last offset is the address of the first byte of the actual compressed data (i.e., following the SOS segment).

FPXR Contents List Data Area

The image file may also include an FPXR contents list segment (FPXR type 0x01). This segment contains a list of streams that are to be added to the FlashPix image object created from the JIF file. Since property sets, such as the FlashPix Image Information Property Set, are special cases of streams, they are easily handled via this mechanism.

The format of the FPXR contents list data area is defined in Table 6 below.

TABLE 6

FPXR Contents List Data Area.

| Offset | Value | Description |
|---|---|---|
| 11 | | Number of entries = N |
| 12 | | |
| 13 | | Name/size pairs - one pair for each entry |

The number of entries, N, is a 16-bit unsigned integer in big endian format defining how many streams are to be added to the FlashPix image object. For each of these entries, a pair is provided giving the name of the stream to create and the size (in bytes) of the stream data. These pairs are packed tightly in the bytes of the file starting at offset 13 in the FPXR segment. Each pair has an associated index number (0, 1, . . . , N-1) that is implicitly derived from its position in the array of pairs.

The first member of each name/size pair is a WCHAR (16-bit per character, null-terminated string in the Unicode code page) containing the name of the FlashPix stream to create. The stream includes a complete pathname specification relative to the FlashPix image object storage, for example "\005SummaryInformation. The second member of each name/size pair specifies the size (in bytes) of the stream that is being created.

FPXR Stream Data Area

For every entry in the FPXR contents list segment, there are 1 or more FPXR stream data segments that define the contents of the streams to be created. Since APPn segments are limited to a size of 64K bytes each, it is possible that stream data might be split across multiple FPXR segments (e.g., an audio extension). Therefore, the FPXR stream data segment provides a mechanism for such splitting.

The format of the FPXR stream data area is defined in Table 7 below.

TABLE 7

FPXR Stream Data Area.

| Offset | Value | Description |
|---|---|---|
| 11 | | Index in contents |
| 12 | | list |
| 13 | | Offset to start |
| 14 | | of data in full FlashPix |
| 15 | | stream |
| 16 | | |
| 17 | | Stream data |

The first entry is a 16-bit unsigned integer that specifies the index number from the contents list that this stream data corresponds to. The second entry is a 32-bit unsigned integer that specifies the offset (measured in bytes, relative to zero) into the full FlashPix stream where the following data belongs. The size of the stream data in a particular FPXR stream data area is L-15 bytes (where L was defined as in Table 5). In the most simple case, a stream fits completely in one FPXR segment, and the offset value would be zero. In other cases, the stream data is separated across multiple FPXR segments all of which have the same "index" number (and each having different offset numbers).

Creating Property Sets

The binary format for property sets is contained in section A.2 of the aforementioned FlashPix Specification. To include this information within a JIF compatible file, the FPXR stream data area of the application segment (i.e., starting at byte 17 in the segment) contains the binary content of a property set. A property set consists of a Property Set Header followed by a Property Set Format ID/Offset Pair followed by the one and only one Property Set Section containing the actual properties. The Property Set Header is a fixed size array (28 bytes) containing constant values (per property set). The Format ID/Offset Pair is a fixed size array (20 bytes) also containing constant values (per property set). Therefore, the only variable portion is that of the section.

The format of a Property Set Section follows the conventions of Appendix A of the FlashPix Specification. A section consists of a Section Header, followed by an array of Property ID/Offset Pairs, followed by an array of Property TypeNalue pairs. The section header contains two DWORDs (i.e., 32-bit integer values). The first DWORD is the size of the section (in bytes). The second DWORD is the count of properties, m, contained in the section.

Immediately following the header is an array of m pairs. Each pair consists of two DWORDs. The first DWORD in a pair contains a Property ID (PID). The second DWORD contains the offset within the section to the first byte of the type/value pair for the property with the PID specified in the first DWORD. These offsets are measured in bytes from the start of a section to the start of the type/value pair. This means that the offsets can be copied directly from the FPXR application segment into a structured storage file property set without any recalculation of offsets. This array of pairs is not required to be sorted in any particular order (i.e., the PIDs are in any order chosen by the writer). The PIDs that are allowed to be contained in the array are those defined by the corresponding property sets in the FlashPix format.

Immediately following the PID/offset array is a "list" of m pairs. Each pair consists of a DWORD type indicator and the value for a particular property. The value is variable size in length as dictated by the type indicator. All type/value pairs begin on a 32-bit boundary in the section. The possible types are given in Table 8 below.

TABLE 8

Property Types

| Type Name | Type Value |
| --- | --- |
| VT_I2 | 2 |
| VT_I4 | 3 |
| VT_R4 | 4 |
| VT_R8 | 5 |
| VT_DATE | 7 |
| VT_BOOL | 11 |
| VT_VARIANT | 12 |
| VT_I1 | 16 |
| VT_UI1 | 17 |
| VT_UI2 | 18 |
| VT_UI4 | 19 |

TABLE 8-continued

Property Types

| Type Name | Type Value |
| --- | --- |
| VT_I8 | 20 |
| VT_UI8 | 21 |
| VT_INT | 22 |
| VT_UINT | 23 |
| VT_LPSTR | 30 |
| VT_LPWSTR | 31 |
| VT_FILETIME | 64 |
| VT_BLOB | 65 |
| VT_CF | 71 |
| VT_CLSID | 72 |
| VT_VECTOR | 0x1000 |
| VT_ARRAY | 0x2000 |

The data formats corresponding to each of the property types are contained in section A.2.3 of the FlashPix Specification.

JPEG Restart Markers

The compressed image data in the JPEG stream must contain restart markers (RST) at the beginning of every JPEG block that begins a new 64-pixel boundary. The number of minimal coding units (MCUs) that this corresponds to varies depending on the chroma subsampling and component interleaving methods being applied.

An MCU block is comprised of the total number of MCUs necessary to encode all supplied components according to their sampling factor and interleaving method. All components are interleaved in FPXR files.

In the case of chroma subsampling value 0x11 (horizontal and vertical subsampling ratios of 1), there are 3 MCUs per each 8×8-pixel block (no subsampling therefore no reconstruction). Therefore, the RST markers occur every 8 MCU blocks (24 MCUs).

For a chroma subsampling value of 0x22 (H/V ratios of 2), there are 6 MCUs per each 16×16 pixel block (after reconstruction is performed). Therefore, the RST markers occur every 4 MCU blocks (24 MCUs).

For a chroma subsampling value of 0x21 (Horizontal subsampling ratio of 2, vertical of 1), there are 4 MCUs per each 16×8 pixel block (after reconstruction is performed). Therefore, the RST markers occur every 4 MCU blocks (16 MCUs).

The locations specified above for RST markers are the only ones included in a file containing the FPXR application marker. In other words, a reader application that senses that a JIF file is in fact an FPXR file can safely assume that the only RST markers that will be encountered in the JPEG stream are those that are placed according to the above rules to facilitate the tiling of the FlashPix data.

The invention has been described with reference to a preferred embodiment. However, it will be appreciated that variations and modifications can be effected by a person of ordinary skill in the art without departing from the scope of the invention.

PARTS LIST

| | |
| --- | --- |
| 10 | digital still camera |
| 12 | first host computer |
| 14 | second host computer |
| 16 | lens |
| 18 | CCD sensor |
| 20 | A/D converter |

-continued

| 22 | programmable processor |
| 24 | removable memory card |
| 26 | interface |
| 28 | image memory |
| 30 | color LCD display |
| 32 | user button |
| 40 | file |
| 42 | directory |
| 50 | card reader |

The invention claimed is:

1. A device for processing and storing digital images, the device comprising:
   a processor; and
   an electronic memory coupled to the processor, the electronic memory including a digital image file for storing only one full resolution digital image, the processor for reading the digital image file, for generating and storing entropy coded data for said full resolution digital image, for storing first ancillary encoded data in said digital image file using a first encoding method to generate first ancillary information for said full resolution digital image, and for storing second ancillary encoded data in said digital image file using a second encoding method different from said first encoding method for generating said first ancillary information for said full resolution digital image.

2. A device as claimed in claim 1, wherein the first ancillary encoded data is encoded using a TIFF tag.

3. A device as claimed in claim 1, wherein the entropy coded data is discrete cosine transform compressed data blocks in 64×64 tile segments.

4. A device as claimed in claim 1, wherein the first ancillary encoded data is encoded using a TIFF tag, and the second ancillary encoded data is encoded using a second encoding method other than TIFF tags.

5. A device as claimed in claim 1, wherein the first ancillary information provides an image capture date of the full resolution digital image.

6. A device as claimed in claim 1, wherein the first ancillary information provides a camera parameter.

7. A device as claimed in claim 1, wherein the first ancillary information provides an image copyright owner of the full resolution digital image.

8. A device as claimed in claim 1, wherein the first ancillary information provides a description of the full resolution digital image.

9. A device as claimed in claim 1, wherein the electronic memory comprises a removable memory card.

10. A tangible computer readable medium for storing instructions readable by the computer and which, when executed by the computer, enables the computer to perform the steps of:
    retrieving a digital image file from a digital storage device that is electronically accessible by the computer, the digital image file comprising only one full resolution digital image;
    storing entropy coded data for said full resolution digital image;
    storing first ancillary encoded data in said digital image file using a first encoding method to convey a first ancillary information for said full resolution digital image; and
    storing second ancillary encoded data in said digital image file using a second encoding method different from said first encoding method for conveying said first ancillary information for said full resolution digital image.

11. The computer readable medium according to claim 10, wherein the computer comprises a digital camera.

12. The computer readable medium according to claim 10, wherein said step of storing entropy code data is performed by a digital camera.

13. The computer readable medium according to claim 10, wherein said step of storing first ancillary encoded data is performed by a digital camera.

14. The computer readable medium according to claim 10, wherein said step of storing said second ancillary encoded data is performed by a digital camera.

15. The computer readable medium according to claim 10, where said first encoding method comprises using a TIFF tag.

* * * * *

UNITED STATES PATENT AND TRADEMARK OFFICE
CERTIFICATE OF CORRECTION

PATENT NO.         : 8,508,623 B2
APPLICATION NO.    : 13/209013
DATED              : August 13, 2013
INVENTOR(S)        : Parulski et al.

It is certified that error appears in the above-identified patent and that said Letters Patent is hereby corrected as shown below:

On the title page, item (56), under "OTHER PUBLICATIONS", in Column 2, Line 1, delete "Camers," and insert -- Camera, --, therefor.

In the Specifications:

In Column 2, Line 52, delete "example)" and insert -- example). --, therefor.

In Column 8, Line 39, delete "Information." and insert -- information". --, therefor.

In Column 9, Line 27, delete "TypeNalue" and insert -- Type/Value --, therefor.

In Column 10, Line 37, delete "(HN" and insert -- (H/V --, therefor.

In the Claims:

In Column 11, Line 30, in Claim 2, delete "A device" and insert -- The device --, therefor.

In Column 11, Line 32, in Claim 3, delete "A device" and insert -- The device --, therefor.

In Column 11, Line 34, in Claim 4, delete "A device" and insert -- The device --, therefor.

In Column 11, Line 38, in Claim 5, delete "A device" and insert -- The device --, therefor.

In Column 12, Line 1, in Claim 6, delete "A device" and insert -- The device --, therefor.

In Column 12, Line 3, in Claim 7, delete "A device" and insert -- The device --, therefor.

Signed and Sealed this
Twenty-ninth Day of April, 2014

Michelle K. Lee
*Deputy Director of the United States Patent and Trademark Office*

In Column 12, Line 6, in Claim 8, delete "A device" and insert -- The device --, therefor.

In Column 12, Line 9, in Claim 9, delete "A device" and insert -- The device --, therefor.

In Column 12, Line 39, in Claim 15, delete "where said" and insert -- wherein said --, therefor.